United States Patent
Haleem et al.

Patent Number: 6,055,432
Date of Patent: *Apr. 25, 2000

[54] DYNAMIC CHANNEL ALLOCATION IN MACROCELLS WITH RANDOM EXCLUSION FOR ALLOWING UNDERLAYING AUTONOMOUS MICROCELLS

[75] Inventors: Mohamed Abdul Haleem, Keyport Township, Monmouth County; Chih-Lin I, Manalapan Township, Monmouth County, both of N.J.

[73] Assignee: Lucent Technologies Inc., Murray Hill, N.J.

[ * ] Notice: This patent is subject to a terminal disclaimer.

[21] Appl. No.: 08/911,693

[22] Filed: Aug. 15, 1997

[51] Int. Cl.$^7$ .................................................. H04Q 7/00
[52] U.S. Cl. ............................................ 455/452; 455/449
[58] Field of Search .................... 455/422, 450, 455/451, 452, 453, 447, 446, 449, 509

[56] References Cited

U.S. PATENT DOCUMENTS 5,809,423  9/1998  Benveniste .............................. 455/452

*Primary Examiner*—Reinhard J. Eisenzopf
*Assistant Examiner*—Marsha D. Banks-Harold

[57] ABSTRACT

Co-Existence Dynamic Channel Assignment (DCA) techniques for overlay macrocellular systems facilitate the coexistence of embedded autonomous underlay microcellular (e.g., indoor) systems. The Co-existence of the two systems without excessive mutual interference is achieved through statistical systematic exclusion of predefined subsets of the universal channel set from the dynamic assignment to the overlay macrocells. The sets of channels are made available to the underlay systems. The exclusion is done with minimal DCA performance degradation.

27 Claims, 9 Drawing Sheets

| EXCLUSION SCHEME | OPTIMUM/EFFICIENT PARAMETERS |
|---|---|
| COMMON | $|E_i|$ |
| 2-MIN | $|E_i|, \left|\bigcap_{i \in C} E_i\right|$ FOR $C \leq |\Omega|$ |
| 6-MIN | $|\Omega|$ |
| 3-MIN | $\left|\bigcup_i E_i\right|, |\Omega|, |E_i|$ |
| FPP | $\left|\bigcup_i E_i\right|, |\Omega|, R$ |
| INVERSE-FCA * | $R, |\Omega|, |E_i|, \left|\bigcup_i E_i\right|$ |

DYNAMIC CHANNEL ALLOCATION IN MACROCELLS WITH RANDOM EXCLUSION FOR ALLOWING UNDERLAYING AUTONOMOUS MICROCELLS

CROSS-REFERENCE TO RELATED APPLICATIONS

Related subject matter is disclosed the concurrently filed application entitled "DYNAMIC CHANNEL ALLOCATION IN MACROCELLS WITH DETERMINISTIC EXCLUSION FOR ALLOWING UNDERLAYING AUTONOMOUS MICROCELLS" by M. A. Haleem and C.-L. I, both applications are assigned to the same Assignee.

TECHNICAL FIELD OF THE INVENTION

This invention relates generally to wireless systems and, more specifically, to an apparatus for and method of providing Dynamic Channel Assignment (DCA) for macrocellular systems which facilitates the coexistence of embedded autonomous microcellular environments.

BACKGROUND OF THE INVENTION

The co-existence of outdoor macrocellular wireless systems (e.g., cellular and personal communication systems) and indoor microcellular systems requires the prevention of mutual interference. This is easily achievable with the conventional Fixed Channel Assignment (FCA) where only a part of the whole spectrum is assigned to each of the outdoor cells.

An indoor mobile environment popping up within a cell or at the boundaries common to two or more cells has plenty of spectrum for utilization without mutual interference with the outdoor mobile conversations. With proper settings of power levels and the choice of frequencies for indoor cells the two systems can be set for interference free operation.

Dynamic Channel Assignment (DCA) has been shown to be a promising technique in enhancing the spectral utilization in the wireless communication systems. For example, see the articles by Chih-Lin I. and P. Chao, "Local Packing-Distributed Dynamic Channel Allocation at Cellular Base Station," Proc. GLOBCOM 1993 and "Local Packing-Distributed Dynamic Channel Allocation with Cosite Adjacent Channel Constraints," Proc. IEEE PIMRC 1994 and the article by M. Haleem, K. Cheung, and J. Chuang, "Aggressive Fuzzy Distributed Dynamic Channel Assignment for PCS," Proc. ICUPC 95, pp. 76. These DCA algorithms range from simple selection of a feasible channel, to maximal packing where a call request is rejected only when there is no feasible channel with all possible rearrangements. Even the simplest of them were shown to achieve very high throughput performance compared to FCA, while maintaining the link quality given by FCA. With conventional DCAs, every base station is allowed to carry out conversation with the user on any channel in the operated frequency range. Hence at a given location in the cellular radio environment, one can expect to experience interference over any part of the frequency spectrum allocated for the mobile radio operation. As such, the coordination required to avoid mutual interference between short range wireless applications (indoor) and outdoor mobile application while maintaining the capabilities of conventional DCAs is a challenging one.

SUMMARY OF THE INVENTION

In accordance with the present invention, we describe apparatus for and method of providing Dynamic Channel Assignment (DCA) for macrocellular systems which facilitates the coexistence of autonomous underlay microcellular environments. We call our technique Co-Existence DCA (CE-DCA), because it avoids mutual interference between the macrocellular wireless systems (also referred to herein as an overlay system) and the autonomous microcellular wireless system (also referred to herein as an underlay system). Our CE-DCA technique enables macrocells of the overlay system, while running DCA, to be excluded from the use of a small part of the spectrum which is made available to the coexisting underlay system. The exclusion simultaneously ensures at least certain numbers of channels available to the underlay system(s), wherever they exist, and ensures minimal capacity degradation in the overlay system running the new DCA. Our CE-DCA technique may also utilize any of the well known efficient DCA techniques. (e.g. Local Packing (LP-DCA).

More particularly, in accordance with the present invention, apparatus and a method enables a predetermined number of channels to be excluded from one or more macrocells of the overlay system which overlap one or more cells of the underlay system. This allows the excluded channels to be allocated to the autonomous underlay system or allow those channels to be scanned and seized by the underlay system. The predetermined number of channels to be excluded are selected randomly and distributively in the one or more macrocells of the overlay system so as to statistically satisfy both $$\left| \bigcap_{i \in P} E_i \right| \geq N_{min} \qquad \text{Eq 1}$$

where P is any set of mutually adjacent three cells, and $$\bigcap_{i \in \Omega} E_i = \phi \qquad \text{Eq 2}$$

where $\Phi$ is the null set and where $\Omega$ is a set of cells belonging to a universal cluster, the universal cluster being the minimal set of clustered cells with no common exclusion channels.

According to other features, DCA may be 1) centrally controlled by a centralized access controller, 2) distributively controlled by base stations of the one or more macrocells which overlap the one or more cells of the underlay system, or 3) provided by having the underlay system scan to determine the predefined number of channels that have been excluded from the overlay system.

DETAILED DESCRIPTION

1. General

In the following description, each item or block of each figure has a reference designation associated therewith, the first number of which refers to the figure in which that item is first located (e.g., 110 is located in FIG. 1).

Figure 1:
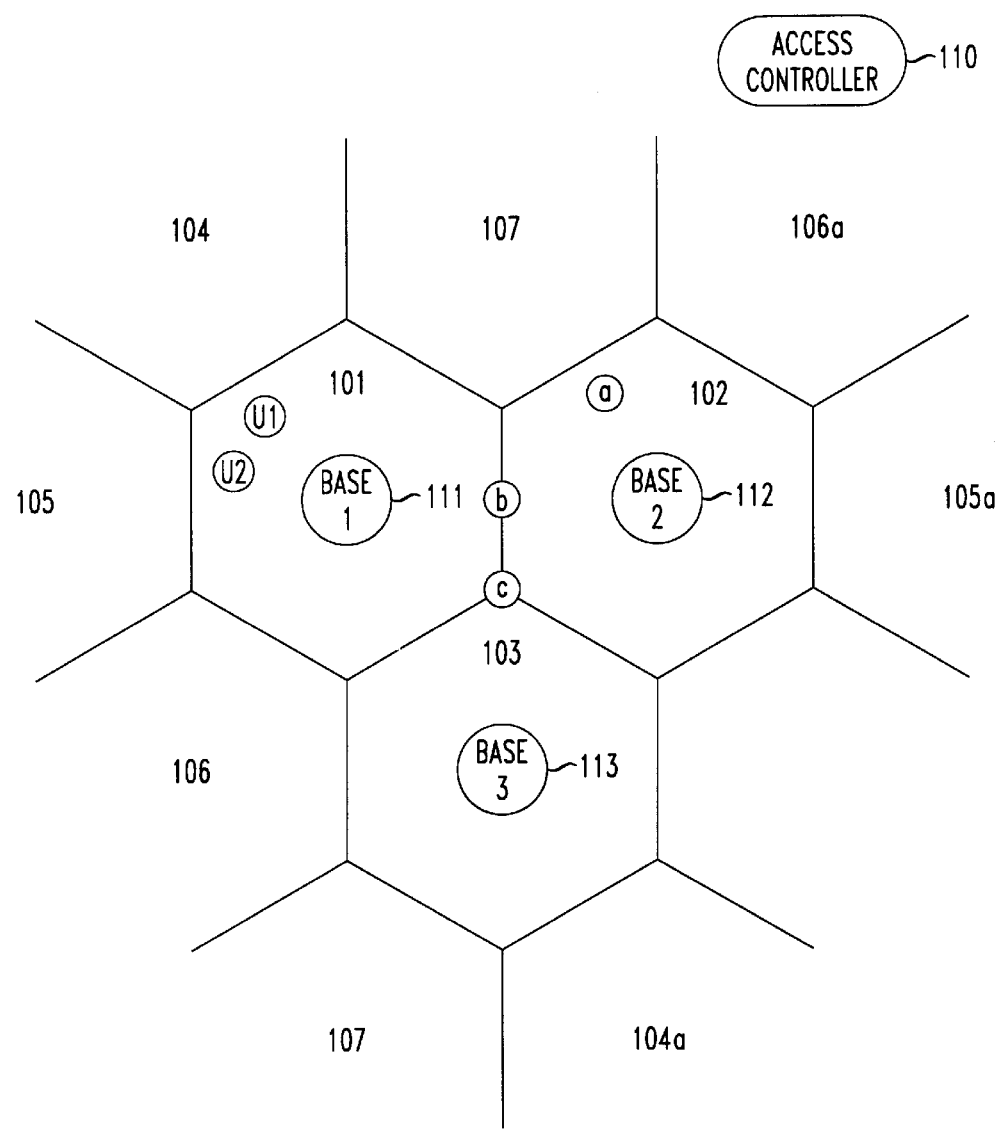
FIG. 1 shows an illustrative idealized layout of a wireless communication system in which the present invention may be utilized.

Shown in FIG. 1 is an illustrative idealized layout of a wireless communication system in which the present invention may be utilized. While the cell layout is shown as a regular hexagonal grid, for illustration and analysis purposes, it should be understood that in actuality the layout need not be regular and the cells can be any shape and need not be uniform in size. The size and shape of the cells are typically determined by geographic and other environmental factors. As an example, use of 7-cell frequency reuse as reference, cells identified by different numbers (e.g., 101–107) are members of the same cluster set and must be served by different sets of channel frequencies to avoid interference problems. Cells of other cluster sets may use the same sets of channel frequencies. Thus, cell 106a may use the same frequency set as cell 106. Each cell includes a base station ( e.g., Base1, 111) for controlling communications to a plurality of mobile stations or users (e.g., U1 and U2) within its cell.

As shown, one or more cells, e.g., 102, may include underlay microcellular systems located entirely within "a", at a boundary common to two neighboring cells "b" or at a corner common to three mutually adjacent cells "c". These microcells also utilize sets of the frequency channels for communications between mobile users both within and outside of the microcell. To help distinguish the cellular system types cells, the group of hexagonal cells (cells) will also be referred to as overlay macrocellular and/or outdoor systems and the underlay microcells referred to as a microcellular and/or indoor systems.

In one embodiment of the present invention, a centralized access controller 110 is utilized to provide our technique of Dynamic Channel Assignment (Co-Existence DCA or CE-DCA) among macrocells of each cluster set ( e.g., macrocells 101–103) of the overlay macrocellular systems to facilitate the coexistence of embedded autonomous underlay microcellular systems (a, b, and c). The Co-existence of the two types of systems without excessive mutual interference is achieved through systematic exclusion of predefined subsets of the universal channel set from the dynamic assignment to the macrocells. The sets of channels so excluded results in a guaranteed number of channels available to an embedded autonomous microcellular system ( e.g., an indoor system). Using our CE-DCA technique, exclusion is done with minimal DCA performance degradation in the macrocellular systems (typically an outdoor system).

Figure 2:
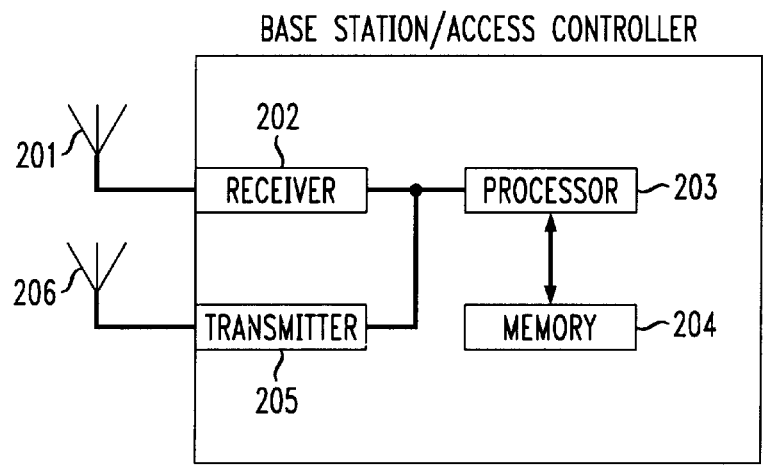
FIG. 2 shows an illustrative block diagram of a base station of a cell.

Shown in FIG. 2 is an illustrative block diagram suitable to represent a base station, e.g., 111, and an access controller 110. As shown a modulated signal carrier signal is received at antenna 201 and is processed by receiver 202 under control of processor 203 and stored programs in memory 204. The transmitter 205 transmits a modulated signal carrier signal via antenna 211 under control of processor 203. The transmitter 205 and receiver 202 of the base station function to send/receive mobile station communication signals as well as control signals. The transmitter 205 and receiver 202 of the access controller 110 functions to send/receive control signals to/from the base stations.

The standard wireless operation of base station 111 is well known and is dependent on the particular system communication characteristics and is not further described herein. In one embodiment, the base station 111 also communicates with and operates under control of the centralized access controller 110 of FIG. 1 which controls channel allocation functions for the overlay system. In such an arrangement, centralized access controller 110 receives a request a request from an embedded autonomous underlay system for a predetermined number of communication channels. In response to the received request, the centralized access controller 110 excludes a predetermined number of channels from use by one or more macrocells of the overlay system which overlap one or more cells of the underlay system. The excluded channels may be selected to deterministically meet only one of a group of requirements including (1) satisfying both equations 1 (EQ 1) and 2 (EQ 2), (2) violating EQ 1 and satisfying EQ 2; and (3) satisfying EQ 1 and violating EQ 2. Thereafter the base station for each of the one or more macrocells are signaled to exclude the excluded channels. The base station 111 processor 203 is then responsive to commands from access controller 110 to assign and exclude frequency channels to mobile users within its cell 101. The centralized access controller 110 also sends an assignment signal to the requesting underlay system identifying that the frequency channels excluded from the macrocells are to be allocated to the underlay system for communications.

In another distributed control embodiment, none of the base stations 111–113 operate under control of access controller 110 for channel allocation functions, but rather communicates with each other to coordinate channel allocations and channel exclusions. The operation begins when one or more of the base stations of the overlay system receives a broadcast request from an embedded autonomous underlay system for a predetermined number of communication channels. In response to the received request, the receiving base station(s) determines, in conjunction with other base stations of the one or more macrocells of the overlay system, which overlap one or more cells of the embedded autonomous underlay system, which predetermined number of channels should be excluded by those macrocells. Again, the excluded channels are selected so as to deterministically meet one of the previous described group of requirements.

The above two embodiments of the base station are utilized with the systematic planned exclusion techniques, described in later paragraphs. In yet other embodiments, a random exclusion techniques rather than a deterministic technique, as described in a later paragraph, is utilized for defining channel exclusion. These random embodiments may operate in either a centralized manner, where the access controller 110 controls channel exclusion or in a distributed manner where the base stations together determine the channels to be excluded. The operation for both the centralized and distributed random embodiments operate in a similar manner to the previously described centralized and distributed deterministic embodiments. However in the centralized and distributed random embodiments, excluded channels are selected so as to statistically satisfy both EQ1 and EQ2.

In access controller 110, processor 203 is arranged to provide the standard access control functions for the underlay macrocellular system of FIG. 1 and in addition, if required, may be arranged to provide any of the enhanced CE-DCA functions to facilitate the coexistence of embedded autonomous microcellular systems as described above.

2. Co-Existant DCA

Since the frequency spectrum allocated to the macrocellular system of FIG. 1, is divided into frequency channels and in turn into time slots, the following discussion is carried out in terms of channels and channel sets. The advantage of Dynamic Channel Assignment (DCA) lies in the fact that every cell is free to choose any channel from the universal set of channels available to the network, the only constraint is imposed through the interference from the neighboring/interfering cells in the same network. This capability provides capacity gain in addition to ease of radio frequency planning. However, it makes it very difficult for a indoor autonomous wireless (i.e., microcell) system to find available channels. To accommodate the coexisting indoor wireless systems, e.g., microcells, a–c of FIG. 1, our invention describes a unique technique for excluding subset of channels, in each macrocell of the overlay system, from the universal set of channels, U. We start by defining the design of CE-DCA as "the search for channel exclusion patterns to minimize capacity loss in the overlay macrocellular system while maximizing the quantity of channels acquired by the underlay microcellular system". Such an exclusion pattern should provide sufficient amount of channels to an underlay microcellular system wherever they are located, within the overlay macrocellular system. In other words, the set of channels available to each underlay microcellular system are the ones never utilized by its nearby overlay macrocells which may otherwise cause mutual interference.

The above objective can be achieved by excluding channel sets in those macrocells in the neighborhood of the underlay microcellular system. The intersection of those exclusion sets ought to be large enough to provide the required amount of channels to the underlay microcellular environment.

Our technique ensures that this new constraint causes minimal degradation in performance compared to conventional DCAs (without exclusion). As an autonomous underlay, an indoor wireless environment may pop up within a cell ("a" of FIG. 1), or at a boundary common to two or more cells ("b" or "c" of FIG. 1). Using the idealized hexagonal cellular topology of FIG. 1, a microcell can exist in no more than 3 mutually adjacent cells, depicted as c in FIG. 1. (In practice, a microcell may sometimes overlap with more than 3 macrocells coverage areas.)

Let $E_i$ be the set of channels excluded in macrocell i when executing DCA, $N_{min}$ be the minimum number of channels required for an indoor mobile environment (e.g., c of FIG. 1), then the requirement is, $$\left| \bigcap_{i \in P} E_i \right| \geq N_{min} \quad (EQ\ 1)$$

where P is the set of cells that can cause mutual interference to the underlay microcellular system. The same logic and formulation extend straightforwardly to a complete macrocellular system which may accommodate multiple independent underlay microcellular systems.

In addition to the requirement expressed in equation (1), we introduce further criteria that refine our strategies of the channel exclusions. First, it is intuitively obvious that one should minimize the size of exclusion set per cell, $|E_i|$. Second, the sizes of intersections of exclusion channel sets, $$\left| \bigcap_{i \in C} E_i \right|$$

for $|C| \leq |P|$, also plays an important role in that the smaller they can be kept, the higher capacity macrocells will retain.

Moreover, let us recall one of the fundamental differences between DCA and FCA concerning channel usage. With FCA, the minimal set of cells, W, that can utilize all the channels in U form a frequency reuse cluster; whereas with DCA every cell is allowed to use the entire U. We call $\Omega$ the universal cluster, thus $|\Omega|$ is typically 7 in FCA and 1 in DCA. The "universal cluster" in the context of CE-DCA, is the "minimal set of clustered cells with no common exclusion channels", i.e., $$\bigcap_{i \in \Omega} E_i = \phi \quad (EQ\ 2)$$

where, $\Phi$ is the null set. The requirement posed by equation (1) dictates that $|\Omega| > |P|$. It is obvious $|W|$ should be kept as small as possible and definitely smaller than that of FCA.

Having identified the above parameters, namely, $N_{min}$, $|E_i|$, $$\left| \bigcap_{i \in C} E_i \right|$$

for $|C| \leq |P|$, and $|\Omega|$, that govern the performance of CE-DCA algorithms, it is quite intuitive to see an increase in the above parameter values would have a negative effect on overlay macrocellular systems. However, for a given $N_{min}$, both $|E_i|$ and $$\left| \bigcap_{i \in C} E_i \right|$$

for $|C| \leq |P|$ should be sufficiently large to satisfy the requirements of an underlay microcellular system. On the other hand, $|\Omega|$, whose minimum value of is $|P|+1$, is really independent of $N_{min}$.

Finally, the channel exclusion patterns that minimize the above parameter values while satisfying the requirement in equation (1) may result into different $$\left| \bigcup_i E_i \right|,$$

called the channel span requirement. By definition, $$\left| \bigcup_i E_i \right|$$

must not exceed $|U|$.

Thus, channel span is a factor governing the maximum achievable $N_{min}$, for a given $|U|$.

Our initial formulation of the problem is based on the parameters as identified above. As will be seen from the simulation study in the following section, there are additional factors governing the performance of CE-CDA algorithms. In particular, there are two algorithms, characterized by exactly the same values of the above parameters, provide drastically different performance. Our continued investigations reveal that they differ in a new factor, called the co-channel-exclusion cell layout, defined as "the pattern a particular channel being excluded in the cell layout". Co-channel-exclusion cells are the set of cells with identical $E_i$. It appears that the more compact this layout is the better the CE-DCA performance.

Without loss of generality, the following description is based on a regular hexagonal cellular topology with 2-cell buffering. In the case of FCA, this layout and constraint correspond to a conventional 7 cell frequency reuse cluster. As illustrated in FIG. 1, a microcellular system may be located at three types of locations, labeled as a, b, and c. The number of channels available to the microcells with each CE-DCA depends on the type of location they are, while a minimum of $N_{min}$ channels must be guaranteed by the CE-DCA in the worst case location (i.e. at c). Thus we focus on $|P|=3$ in this description and extensions to layout with different $|P|$ can be made similarly.

3. Exclusion Schemes for CE-DCA

Two classes of CE-DCA algorithms are presented in this section, namely, statistic and deterministic. The deterministic class include six different algorithms. We describe the design of each CE-DCA along with the motivation for the specific design in the following subsections.

3.1 Statistic CE-DCA

The statistic method is designed to preserve one of the advantages conventional DCAs offer, namely, no frequency planning in any form. Each cell independently and randomly picks an exclusion set $E_i$ from the universal channel set, U. All channels in U are chosen with uniform probability. In this case, the requirements posed by equation (1) is satisfied only in the statistical sense. One of the implications is that $|E_i|$ should be sufficiently large to result in $N_{min}$ channels available to the microcells with required level of confidence. In order to investigate this issue, we derive the probability distributions of common exclusion channel set sizes, $$\left| \bigcap_{i \in C} E_i \right|$$

for various $|C|$, in Appendix A.

Figure 9A:
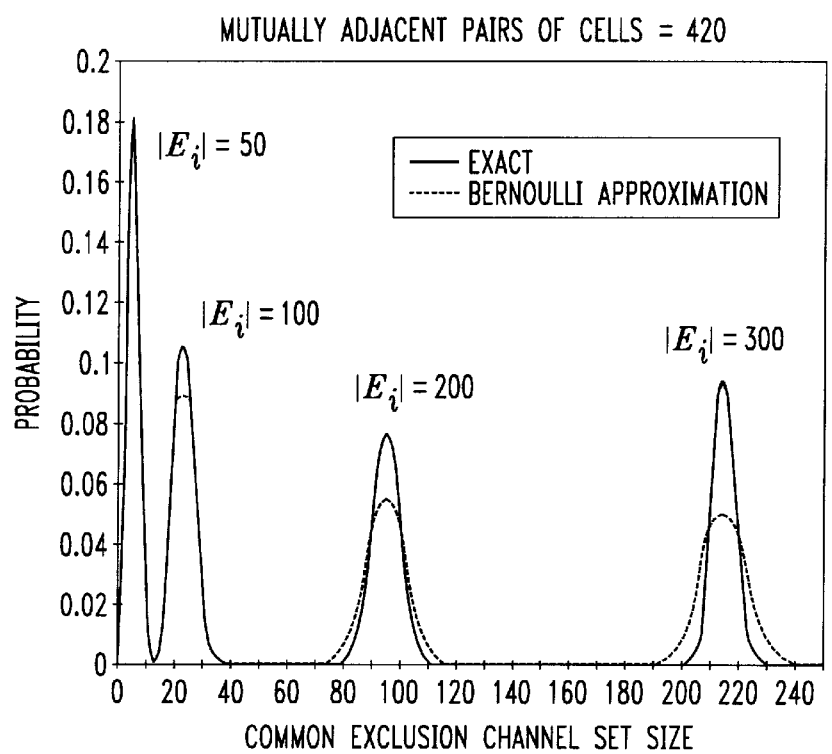
FIG. 9 shows distributions of common exclusion channel set sizes for mutually adjacent cells under statistic CE-DCA.
Figure 9B:
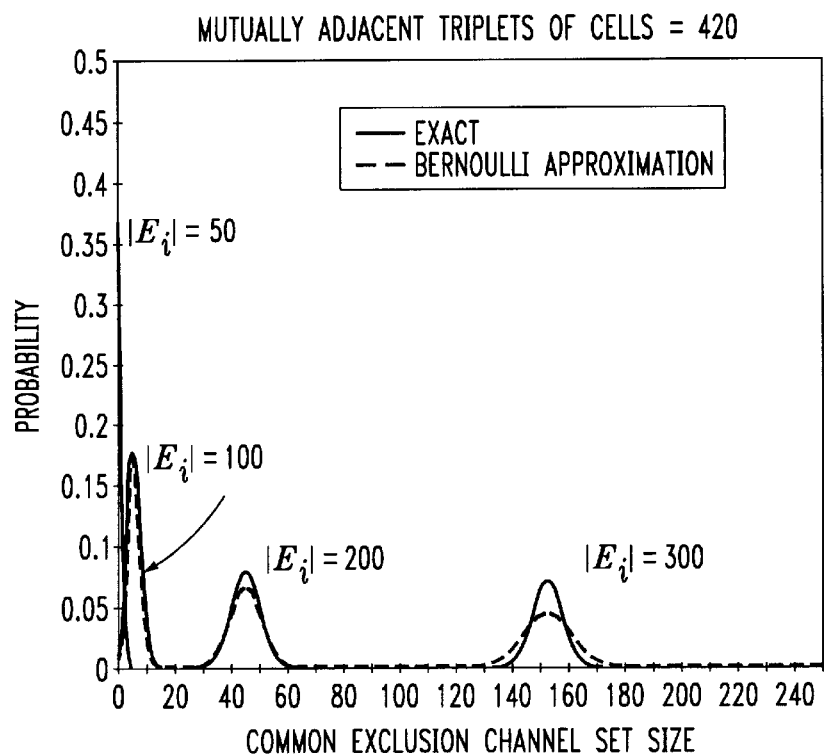
Figure 9C:
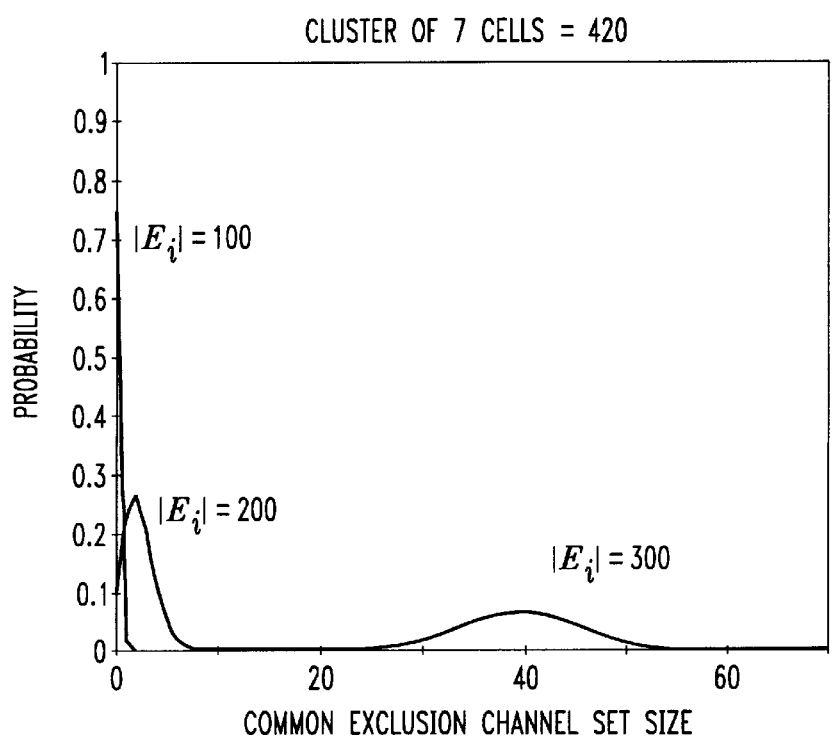

With $|U|=420$ channels in the universal set, FIG. 9 shows typical size distributions, for various $|E_i|$'s, of common exclusion channel sets among mutually adjacent pairs, triplets and clusters of 7 cells. The first two sets of distributions indicate the amount of channels available to a microcellular system overlapping with two and three macrocells respectively. Note that the mean is sufficiently large to provide channels for the underlay microcellular systems while the standard deviation is favorably small to maintain a high confidence level in channel availability. The third distribution shows the degree to which $|Q|\leq 7$ is satisfied. Observe that both the average common exclusion set size for a cluster of 7 cells and its standard deviation appear to be small even with very large values of $|E_i|/|U|$. These properties are highly desirable and encouraging. We thus expect that the statistical CE-DCA will provide us with favorable performance.

3.2 Deterministic CE-DCA

Although the discussion above is encouraging, purely statistical approach does not provide us with direct control over the parameters identified in the previous section. Hence we proceed to seek deterministic methods which will afford us the ability to design with targeted parameter values. We begin by examining the range of parameter $|W|$ in which tradeoffs can be made. At one extreme, if $|E_i|=N_{min}$, every cell would exclude the same set of channels with a size of $N_{min}$. We call this the "common exclusion", which amounts to truncating U by $N_{min}$ channels and the performance degradation is exactly the difference between DCA capacities using $|U|$ and $|U|-N_{min}$ channels, respectively, $|\Omega|=\infty$ in this case. On the other hand, ideally we should be able to design exclusion patterns where every cluster of 3 cells has a common exclusion set of size $N_{min}$, while each group of 4 or more cells are able to utilize the universal set of channels. In this case $|\Omega|$ is 4 which is the minimum value attainable following the basic requirement of CE-DCA.

Figures 10, 11:
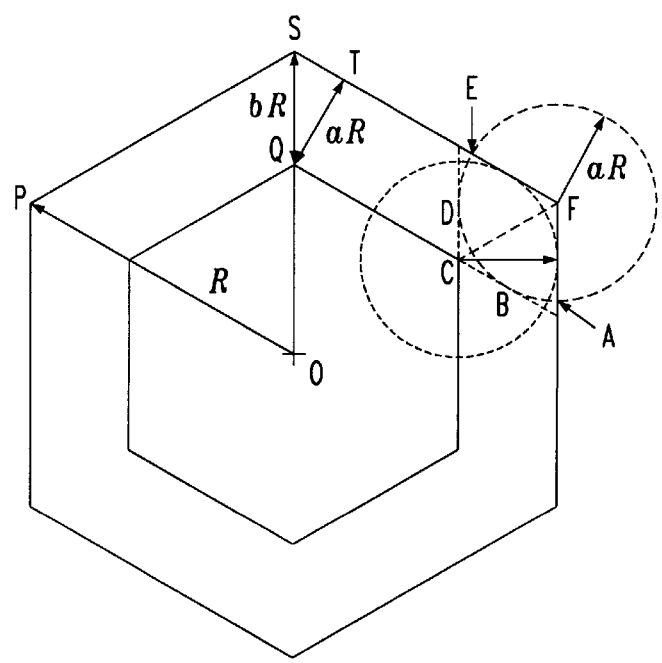
FIG. 10 shows a table of deterministic schemes with the parameters being optimized or enhanced.
FIG. 11 shows, for the description in the Appendix, the corresponding areas in a macrocell centered by a microcell that overlaps with one, two and three macrocells.

In this subsection, we present six deterministic CE-DCAs which attempt to optimize some of the parameters identified in the previous section: Common, 2-Min, 6-Min, 3-Min, FPP and Inverse-FCA Exclusion CE-DCAs. While the Inverse-FCA exclusion scheme does not satisfy the basic requirement in (1), it is presented as a reference case. The Table 1 shown in FIG. 10 summarizes the parameters being optimized or enhanced in each of the algorithm.

In the random exclusion scheme the base station in each cell of FIG. 1 independently determines which channel frequencies will be allocated to the microcell and, hence, won't be used for DCA. The inverse-FCA, 6-Min, 3-Min, and 2-Min exclusion methods are planned systemic channel exclusions where the base stations of FIG. 1 do not independently determine which channels are to be allocated to the microcell and excluded from DCA in the macrocells. In such an arrangement, the access controller 110 of FIG. 1 may centrally control the planned channel exclusion for each of the cells and communicate the information to each base station. Alternatively, the base stations may communicate with each other to decide among themselves as to systemic channel exclusions. Each algorithm along with its design motivation is presented in the following paragraphs.

CE_DCA with Common Exclusion

By definition, equation (1) dictates that $|E_i|$ be at least $N_{min}$. The simplest method is to exclude a unique set with $N_{min}$ channels from all the macrocells so that the set is available to serve the indoor systems at any location. However, as we have discussed before, $|\Omega|=\infty$ in this case, thus it's spectral utilization is inefficient. The CE-DCA performance in the outdoor system is simply that of the baseline conventional DCA algorithm with the truncated U. This capacity loss may not be acceptable by the outdoor service provider especially if some of the indoor systems are operated by independent parties.

CE-DCA with 2-Min Exclusion

Figure 6:
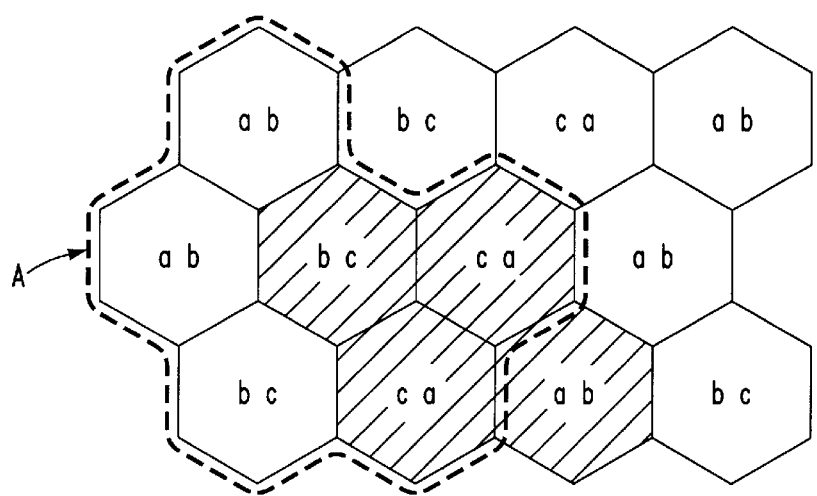
FIG. 6 shows a 2-Min exclusion pattern where a cell is to be excluded from two of the three subsets and where every cluster of 6 cells satisfy (EQ 2)

With the minimum possible value of $|E_i|$, i.e., $N_{min}$, common exclusion is inefficient with regard to all other key parameters. It leads us to conjecture that the optimum strategy for CE-DCA would be one with $|E_i|=kN_{min}$, where $k>1$. We find that the next smallest integer value of k, i.e., 2, ensures a proper tessellation of exclusion sets among macrocells while satisfying equation (1) and results in better $|\Omega|$. As illustrated in FIG. 6, this algorithm requires three mutually exclusive subsets say a, b, and c of size $N_{min}$. Each macrocell is to be excluded from using two of the three subsets of channels. With this exclusion pattern, every cluster of 6 cells satisfy equation (2). Thus, $|\Omega|=6$ which is close to the maximum value, 7, we would consider, since $|\Omega|=7$ in conventional DCA. Moreover, clusters of 4 cells with certain orientation also satisfy equation (2).

CE-DCA with 6-Min Exclusion

Figure 3:
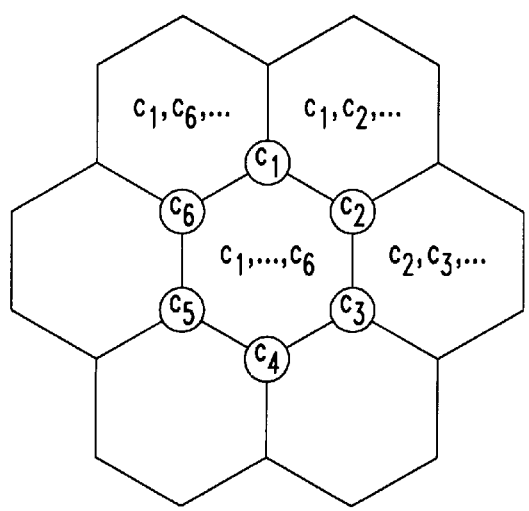
FIG. 3 shows the topology for a "6-Min exclusion" pattern with minimum universal cluster size of 4.

The 2-Min Exclusion scheme provides us with a great value for $|E_i|$, but not cluster size $|\Omega|$. To optimize, we design an exclusion pattern where every cluster of 3 cells has a common exclusion set of size $N_{min}$, while each group of four or more cells are able to utilize the universal set of channels; thus $|\Omega|=4$. The size of exclusion set per cell, $|E_i|$ for this case is found to be 6 $N_{min}$. We name this strategy, the "6-Min exclusion". FIG. 3 shows the topology for a "6-Min exclusion" pattern with minimum universal cluster size of 4. As shown in FIG. 3, for every three mutually adjacent cells to have a common exclusion set $c_i$ of size $N_{min}$, the three cells should be excluded the set $c_i$; whereas for each four cells to have no common exclusion set, each corner of a hexagon has to be assigned a different common exclusion set $c_i$, $i=1, \ldots 6$, and the cell with those six corners has to be excluded all six sets. Note that the reuse of any set $c_i$ at another corner will result in a universal cluster size $|\Omega|$ greater than 4. In order to have a reuse cluster size $|\Omega|$ of 4, the remaining 5 corners of the middle cell must be assigned a different set of channels $c_j$ of size $N_{min}$. Hence the middle cell should be excluded a set of channels of size 6 $N_{min}$.

Figure 4:
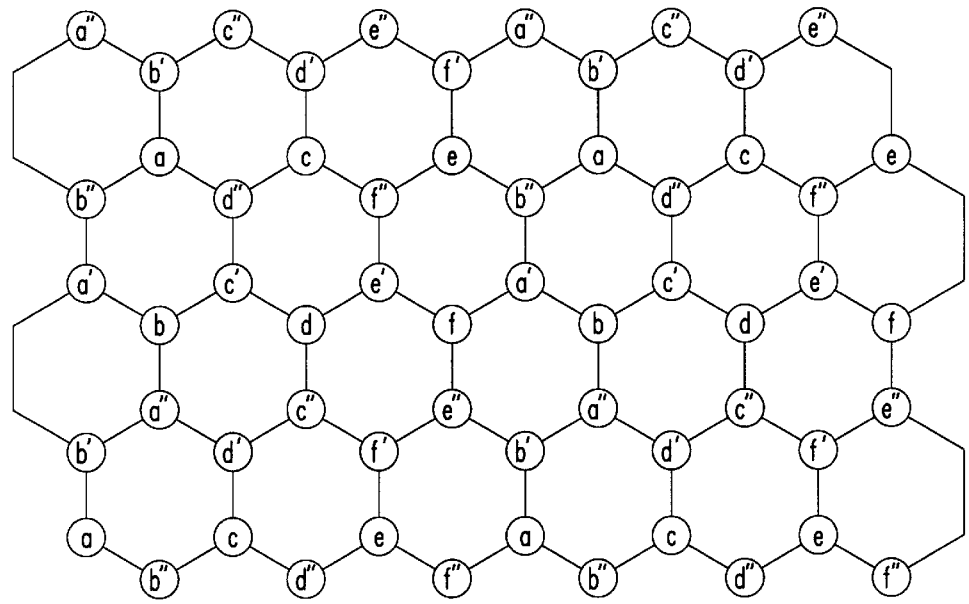
FIG. 4 illustrates the exclusion pattern that satisfies the condition in (EQ 1) while having a universal cluster size of 4.

In FIG. 4, we illustrate the exclusion pattern that satisfies the condition in (EQ 1) while having a universal cluster size of 4. It is achieved by defining 18 mutually exclusive channel sets of size $N_{min}$ within the universal set. To maintain the minimum value of $|\Omega|$, it requires 18 mutually exclusive channel sets of size $N_{min}$ within U. Hence this 6-Min exclusion requires large enough universal channel set, U, to satisfy the condition $|U|>18 \ N_{min}$. As shown in FIG. 4, a 6-Min exclusion pattern is achieved with 18 channel sets of size $N_{min}$. Each corner of a hexagon is assigned an exclusion set chosen from the set of channel sets $\{a, \ldots, f; a', \ldots, f', a'', \ldots, f''\}$. The exclusion set so assigned to a corner is excluded in all three cells with the corner in common. This pattern ensures a reuse cluster size of 4 and has an exclusion set size of 6 $N_{min}$ per cell.

In comparison to the 2-Min Exclusion which optimizes $|E_i|$ but sacrifices $|\Omega|$, the 6-Min Exclusion seems to optimize $|\Omega|$ at the expenses of $|E_i|$.

E-DCA with 3-Min Exclusion

In the quest of reducing $|E_i|$ and the minimal $$\left|\bigcup_i E_i\right|$$

needed, we further designed an exclusion pattern requiring an exclusion pattern that excludes just $3N_{min}$ channels per cell, i.e., $|E_i|=3 \ N_{min}$, and requires only 4 mutually exclusive channel sets of size $N_{min}$ within the universal set U, i.e., $$\left|\bigcup_i E_i\right| = 4.$$

Figure 5:
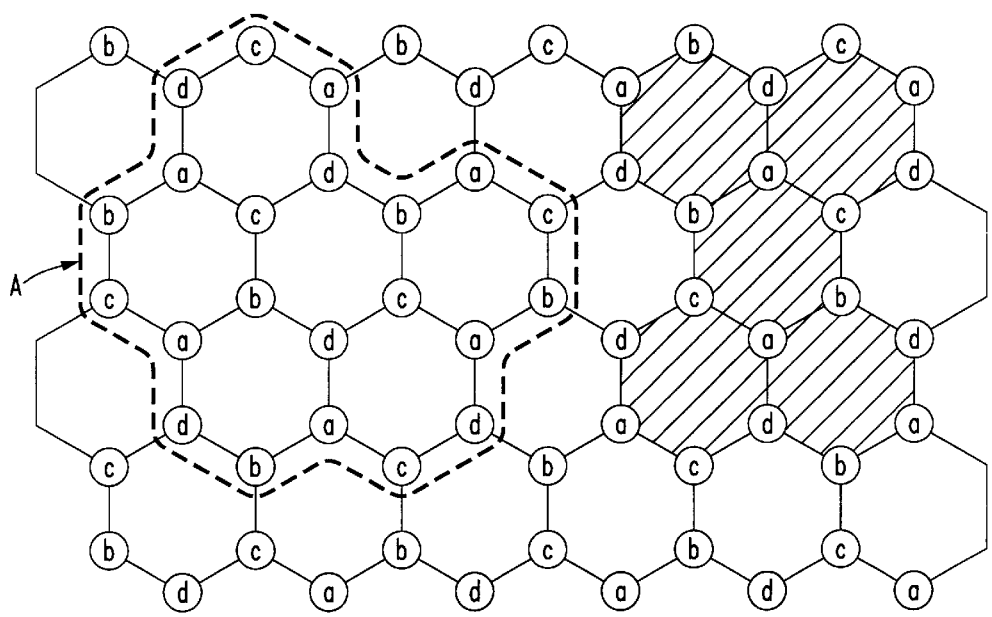
FIG. 5 shows a "3-Min" exclusion pattern where every cluster of 6 cells satisfy (EQ 2)

In FIG. 5 there is shown a 3-Min exclusion pattern achieved with 4 channel sets of size $N_{min}$. Each corner of a hexagon is assigned an exclusion set chosen from the set of channel sets $\{a, b, c, d\}$. The exclusion set so assigned to a corner is excluded in all three cells with the corner in common. This pattern ensures a universal cluster size of 6 and requires an exclusion set size of 3 $N_{min}$ per cell.

This design can accommodate a much larger value of $N_{min}$ for a given universal channel set size, compared to the 6-Min Exclusion; specifically, it only requires $|U|>4 \ N_{min}$. However, although all the clusters of 4 cells and 5 cells with certain shapes and orientations are allowed access to all the channels in U, not every clusters of 5 cells has that property (such as the shaded one). Any cluster of 6 cells such as A is able to use U. Thus $|\Omega|=6$, just like in 2-Min Exclusion. With greater $|E_i|$ than the latter, we expect this scheme to be outperformed by the 2-Min Exclusion.

CE-DCA with Finite Projective Plane (FPP) Exclusion

Among the exclusion schemes presented above, 6-Min is the only one that minimizes $|\Omega|$. Nevertheless, its performance lags behind other schemes as will be seen in the next section. An additional drawback of 6-Min is that it requires a large span of the channel set. In search of techniques to improve the performance and reduce this span, we come up with a Finite Projective Plane (FPP) based exclusion scheme which not only cut down the span from $18N_{min}$ to $14 \ N_{min}$ but also improves the performance significantly.

The FPP Exclusion is similar to 6-Min in that $|E_i|=6 \ N_{min}$, yet it is very different in its selection of $E_i$. The method of exclusion set selection in this scheme stems from the theory of finite projective planes [for example, see the article by Yoshihiko Akaiwa and Hidehiro Andoh, "Channel Segregation—A Self-Organized Dynamic Channel Allocation Method: Application to TDMA/FDMA Microcellular System," IEEE *J. Sel. Areas in Comm.*, Vol. 11, No. 6, Aug. 1993, pp. 949–954; and the article by Albert, A. A., and Sandier, R., "*An Introduction to Finite Projective Planes,*+ Holt, Rinehart, and Winston, New York, 1968.].

The definition of FPP is as follows.

Definition: A FPP of order-q consists of $q^2+q+1$ points and that many lines. Any line is incident with $q+1$ points and any point is incident with $q+1$ lines.

Figure 7A:
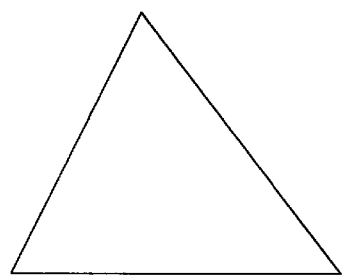
FIGS. 7a and 7b illustrate examples of finite projective planes q=1 and q=2, respectively.
Figure 7B:
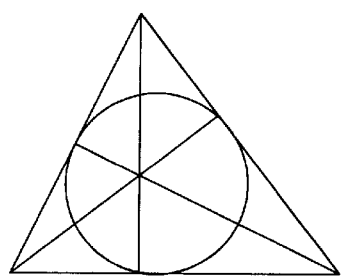

The simplest example of FPP is the FPP of order 1, which is represented by the 3 lines and 3 points of a triangle. FIGS. 7a and 7b show examples of FPP of orders 1 and 2, respectively. Note in FIG. 7b, that the 7 lines and 7 points in the FPP of order 2 includes a circle that represent the $7^{th}$ line. FPP has been used to design new FCA schemes with improved frequency reuse efficiency [for example, see the article by Ueberberg, J., "Interactive Theorem Proving and Finite Projective Planes," *Proc., Int Conf. AISMC-3*, '96, pp. 240–257.]. We apply it to CE-DCA which leads to an efficient co-exclusion channel cell layout.

Figure 7C:
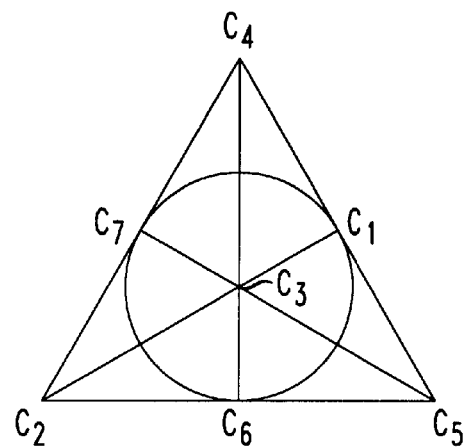
FIG. 7c shows a mapping of exclusion channel sets to an FPP of order 2.

The channel exclusion with optimal $|\Omega|$ (=4) can be mapped onto a FPP of order 2 in the following manner: Consider 7 distinct sets of channels $\{c_1, \ldots, C_7\}$ and map them onto 7 points in the FPP, as illustrated in FIG. 7c. Form 7 subsets (lines), of 3 channel sets (points) each, such that any channel set (point), $c_i$, $i=1, \ldots, 7$ is in 3 of the 7 subsets (lines). These 7 subsets can be assigned to a cluster of 7 cells such that alternative triplets of cells share a commonly excluded channel set, i.e., $c_1$, $c_6$, and $C_7$, as shown in FIG.

Figure 7D:
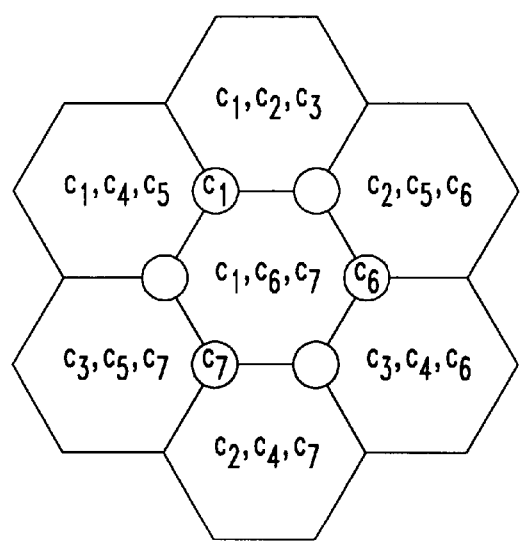
FIG. 7d shows an illustrative exclusion of 7 set of channels $\{c_1, \ldots, c7\}$ in a cluster of 7 cells to provide one common channel set exclusion for alternative triplets of cells.

7d. The procedure is to be repeated with a different set of 7 channel sets to provide common exclusions for the remaining triplets. This pattern is repeated with a 7 cell re-exclusion pattern. Note that only three of the six cell-triplets of interest in FIG. 7d achieve common exclusion due to the fact that each points (channel set) in this FPP of order 2 (7-cell cluster) is incident (shared) by only three lines (cells) and that each line (cell), including the circle (center cell), contains only three points (channels). To provide commonly excluded channel sets to the remaining three cell-triplets of interest, we repeat the same process with a second set of 7 channel sets. The resultant exclusion pattern is shown in FIG. 8a.

Figure 8A:
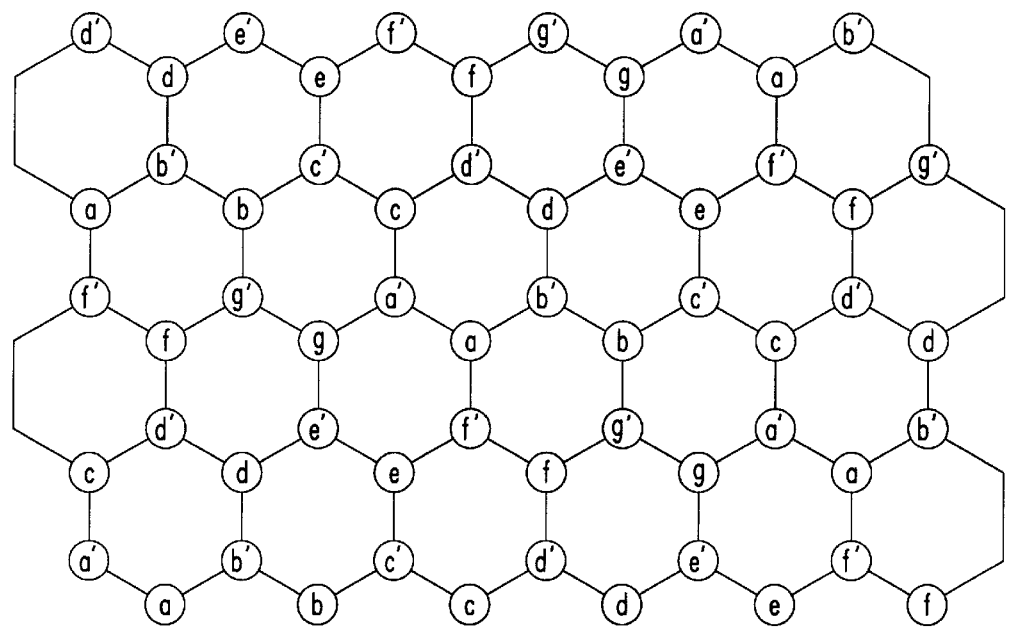
FIG. 8a shows an FPP exclusion achieved with 14 channel sets of size $N_{min}$.

As shown in FIG. 8a, the FPP exclusion is achieved with 14 channel sets of size $N_{min}$. Each corner of a hexagon is assigned an exclusion set chosen from the set of channel sets $\{a, \ldots, g, a', \ldots, g'\}$. The exclusion set so assigned to a corner is excluded in all three cells with the corner in common. This pattern ensures a reuse cluster size of 4 and has an exclusion set size of $6N_{min}$ per cell. The exclusion scheme is derived from the finite projective plane concept.

Figure 8B:
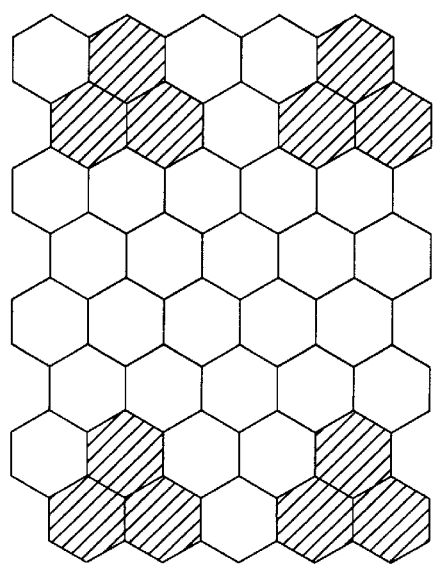
FIGS. 8b and 8c show, respectively, the co-exclusion channel cell pattern (shaded) in 6-Min and FPP exclusion schemes.
Figure 8C:
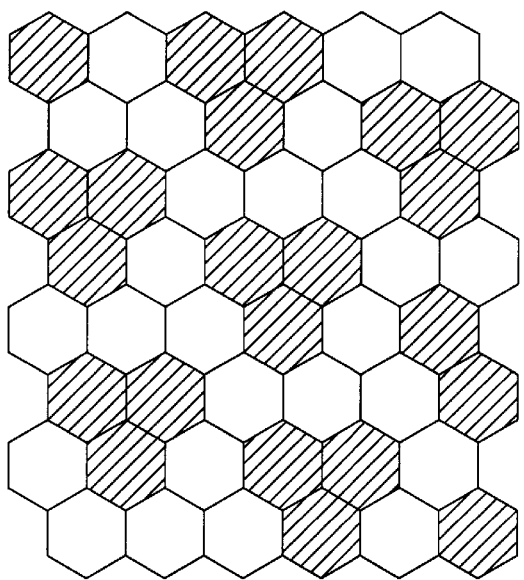

To our delight and amazement, the FPP exclusion scheme proves to offer a far superior traffic performance to that of 6-Min exclusion. Since the two schemes have identical $|E_i|$ and identical $|\Omega|$, but drastically different co-exclusion channel layout (see FIGS. 8b and 8c), we conjecture that the more compact co-exclusion channel cell pattern of FPP exclusion, leading to more efficient channel reuse distances dynamically, is the main contributor of its high performance. The FIGS. 8b and 8c show, respectively, the co-exclusion channel cell pattern (shaded) in 6-Min and FPP exclusion schemes.

CE-DCA with Inerse-FCA Exclusion

Another possibility to achieve $|E_i|=N_{min}$, i.e., minimal exclusion set per cell while minimizing $|\Omega|$, is to define N mutually exclusive channel sets of size $N_{min}$, and then each cell is excluded of the use of one set, with a re-exclusion pattern the same as the FCA pattern with reuse factor of 7. This approach results in $|\Omega|=2$ which is below the minimum value we have identified earlier. Note that the constraint in Equation (1) is violated in this scheme leading to potentially poor microcellular performance. We expect it to offer great DCA performance for the macrocellular system, but the channel availability in the underlayed microcells may not be satisfactory if the ratio of their cell radii is not significantly smaller than one. However since this scheme is characterized with highly efficient co-exclusion channel cell layout, similar to the FPP exclusion, it supports even more traffic than the baseline DCA algorithm without exclusions does.

4. Conclusion

Many microcellular systems, mostly indoor, operate within the same spectrum of outdoor macrocellular network autonomously. Their operations are based on the assumption that there are relatively stationary channel sets never used by the local macrocells. This assumption holds true when the macrocellular system operates under FCA. However, with the realization of the DCA advantages such as its capacity gain and ease of frequency planning, the outdoor/macrocellular systems are turning away from FCA to DCA, and the stationary available channel sets at the locality of autonomous underlay systems will no longer exist.

To satisfy the conflicting needs of both systems, we use Co-Existence DCA (CE-DCA) algorithms, a new class of DCA algorithms for the outdoor/macrocellular wireless systems to permit the coexistence of the autonomous indoor/microcellular systems.

Key factors governing the relative performance of CE-DCA algorithms in outdoor/macrocellular systems are: the size of the exclusion set per macrocell, the size of the universal cluster, and the layout of co-exclusion channel cells. The first one is largely dictated by the minimally required number of available channels in the microcells. The second and third, on the other hand, varies with the type of the exclusion algorithms. The quantity of spectrum acquired by a microcell is dictated by the type of algorithm as well as the relative position of the microcellular system within the macrocellular environment Among the algorithms presented in this disclosure, the simplicity of a CE-DCA with common exclusion is overshadowed by its poor performance, except when the microcells needs only a very small number of channels. Among other deterministic CE-DCA algorithms presented, 2-Min was found to be characterized with optimal exclusion set size per macrocell of twice the minimum requirement. As expected, this algorithm is found to show excellent performance. CE-DCA with 6-Min exclusion provides the smallest universal cluster size and pretty good performance, with the caveat that its' universal set size must be at least 18 times of the number of channels the microcells need. In addition its' performance is found to be far inferior to 2-Min strategy due to the fact that the exclusion set size per macrocell is much larger than in the case of 2-Min and also due to the contributions of the co-exclusion channel cell layout. Though CE-DCA with 6-Min exclusion and FPP based exclusion similar except for the difference in co-exclusion channel cell layout, FPP shows far superior performance. This reveals the fact the co-exclusion channel cell layout has a major contribution towards the enhancement of the performance of CE-DCA algorithms. This conclusion was further reinforced by the performance of CE-DCA with Inverse-FCA exclusion. However, Inverse-FCA exclusion does not satisfy the requirements and hence was described only for the sake of comparison.

In conclusion, CE-DCA with FPP based exclusion appears to be the most efficient approach. If the microcellular systems are reasonably small in radius in comparison with the macrocells, as would be true in most of the cases of interest, we recommend the CE-DCA with random exclusion. Random CE-DCA also preserves the advantage of not requiring global frequency planning.

It is envisioned, that superior CE-DCAs are possible with the use of channel segregation techniques where each channel is assigned a priority factor for assignment in each microcell. Such factors are updated following an adaptive procedure, leading to improved DCA performance on overlay macrocellular system while leaving stationary channels for the utilization of underlay microcellular systems. On the side of statistical approach, there is a possibility for performance improvement by intelligently choosing probability distributions during the selection of exclusion channel sets, instead of selecting them according to an equal probability assumption. The choice of such probability distribution should ensure common exclusion channel set sizes for adjacent pairs and triplets of cells, matching with the placement probabilities of a microcellular system, leading to optimized expected amount of channels for the microcells. The choice of selection probabilities should take into consideration, the effects on overlay macrocells. Such a strategy would have complexities falling between purely random schemes and fully deterministic schemes in terms of the amount of coordination and autonomy.

What has been described is merely illustrative of the application of the principles of the present invention. Other arrangements and methods can be implemented by those skilled in the art without departing from the spirit and scope of the present invention.

APPENDIX i) Common exclusion channel sets under Random Exclusion

Any macrocell i is excluded a set of channels, $E_i$, of size m, which is chosen randomly from the universal set of channels, U. The probabilities of having k (<m) channels in common among two, and three such exclusion sets are [see Chih-Lin I. and P. Chao, "Local Packing-Distributed Dynamic Channel Allocation with Cosite Adjacent Channel Constraints," *Proc IEEE PIMRC '94*.]:

$$\Pr\left(\left|\bigcap_{i=1}^{2} E_i\right| = k\right) = \frac{\binom{m}{k}\binom{M-m}{m-k}}{\binom{M}{m}} \quad (1)$$

$$\Pr\left(\left|\bigcap_{i=1}^{3} E_i\right| = k\right) = \sum_{l=k}^{m} \frac{\binom{l}{k}\binom{m}{l}\binom{M-m}{m-l}\binom{M-l}{m-k}}{\binom{M}{m}^2} \quad (2)$$

In general, the probability for k of m channels in $E_n$ to be in $E_i$: l=1, ..., n−1 is approximated by Bernoulli distribution with probability of success $(m/M)^{n-1}$, the expectation and variance of which are $$\mu = \frac{m^n}{M^{n-1}}$$

and $$\sigma^2 = \frac{m^n}{M^{n-1}}\left(1 - \left(\frac{m}{M}\right)^{n-1}\right)$$

respectively. This result was derived in round robin fashion as follows.

Let $c_j$: j=1, ..., M be any channel in U. Then the probability for any channel to be in an exclusion set is given by, $$\Pr(c_j \in E_i) = \frac{m}{M}.$$

We have randomly selected m channels for all but the last cell n. This is equivalent to n−1 repeated selection of m out of M objects with replacement. The probability for any channel $c_j$ to be in $E_i$ for all i=1, ..., n−1 can be expressed as, $$\Pr(c_j \in E_i \forall i = 1, \ldots, n-1) = \left(\frac{m}{M}\right)^{n-1}.$$

This situation is similar to having a box of M objects where each of them has a certain color with success probability $$p = \left(\frac{m}{M}\right)^{n-1}.$$

Then for M >>m, if m objects are selected randomly, the probability for k out of m objects to be of the mentioned color, is given by the Bernoulli probability, $$\binom{m}{k} p^k (1-p)^{m-k}.$$

Therefore for M>>m, the selection of m channels for the n th cell after the selection of m channels for all n−1 cells is similar to this and hence the required distribution is given by, $$\Pr\left(\left|\bigcap_{i=1}^{n} E_i\right| = k\right) = \binom{m}{k}\left(\frac{m}{M}\right)^{(n-1)k}\left(1 - \left(\frac{m}{M}\right)^{n-1}\right)^{m-k} \quad (3)$$

ii) Probability Distribution of Microcellular Systems' Location

For simplicity, we approximate macrocells by hexagons and microcells by circles. The probabilities of a microcellular system overlapping with one, two or three macrocells correspond to the fractional areas shown in FIG. 11. Let the radii of macrocell and microcell be R and aR. If the center of a microcell is in the inner hexagon with radius (1-b)R, it is enclosed within the single macrocell. A microcell with its center placed within ABCDEF will overlap with three macrocells. The remaining area corresponds to microcells overlapping with two mutually adjacent macrocells. Thus, considering the relative areas, it can be shown that, $$P_1 = \frac{1}{3}(\sqrt{3} - 2a)^2 \quad (4)$$

$$P_2 = \frac{2}{3\sqrt{3}}(6 - (4\sqrt{3} + \pi)a)a + \frac{8}{\sqrt{3}}U[a - 0.5]A \quad (5)$$

and $$P_3 = \frac{2}{3\sqrt{3}}(2\sqrt{3} + \pi)a^2 - \frac{8}{\sqrt{3}}U[a - 0.5]A \quad (6)$$

where $0 < a \leq 0.7$ is the microcell to macrocell radii ratio, U[a] is a unit step function, and $$A = \frac{1}{2}a^2 \cos^{-1}\left(\frac{1}{2a}\right) - \frac{1}{4}\sqrt{a^2 - 0.5^2}.$$

Note that $P_1 > P_2 > P_3$.

We claim:

1. A apparatus of providing Dynamic Channel Assignment (DCA) for at least a part of an overlay macrocellular system to facilitate the coexistence of at least one autonomous underlay system, comprising the steps of excluding a predetermined number of channels from one or more macrocells of the overlay system which overlap one or more cells of the at least one underlay system, where $E_i$ is the set of channels to be excluded from a macrocell i of the overlay system, allocating the excluded predetermined number of channels to the underlay system or allowing those channels to be scanned and seized by the at least one underlay system, where $N_{min}$ is the minimum number of channels available for the underlay system and wherein the predetermined number of channels to be excluded are selected randomly and distributively in the one or more macrocells of the overlay system so as to statistically satisfy both $$\left| \bigcap_{i \in P} E_i \right| \geq N_{min} \qquad \text{EQ 1}$$

where P is any cluster set of mutually adjacent three macrocells, and $$\bigcap_{i \in \Omega} E_i = \phi \qquad \text{EQ 2}$$

where $\Phi$ is the null set and where $\Omega$ is a set of macrocells belonging to a universal cluster, the universal cluster being the minimal set of clustered macrocells with no common exclusion channels.

2. The apparatus of claim 1 wherein at least one cell of the underlay system is located solely in one macrocell of the overlay system.

3. The apparatus of claim 1 wherein at least one cell of the underlay system is located so as to overlap into two mutually adjacent macrocells of the overlay system.

4. The apparatus of claim 1 wherein at least one cell of the underlay system is located so as to overlap into three mutually adjacent macrocells of the overlay system, and $|\Omega|$ is greater than 3.

5. The method of claim 1 further comprising the step of
selecting the size of the universal cluster, $\Omega$, to be as small as possible.

6. The method of claim 1 wherein the size of the exclusion set per cell, $|E_i|$, is as small as possible.

7. The method of claim 1 wherein the common exclusion set per cluster C, $$\bigcap_{i \in C} E_i,$$

for all $|C|>|\Omega|$, is as small as possible.

8. Apparatus for use in at least a part of an overlay macrocellular system for providing Dynamic Channel Assignment (DCA) to facilitate the coexistence of at least one autonomous underlay system, comprising means for excluding a predetermined number of channels from one or more macrocells of the overlay system which overlap one or more cells of the at least one underlay system, where $E_i$ is the set of channels to be excluded from a macrocell i of the overlay system, means for allocating the excluded channels to the underlay system or allowing those excluded channels to be scanned and seized by the at least one underlay system, where $N_{min}$ is the minimum number of channels available for the underlay system and wherein the predetermined number of channels to be excluded from each of the one or more macrocells are selected randomly and distributively in each of those macrocells so as to statistically satisfy both $$\left| \bigcap_{i \in P} E_i \right| \geq N_{min} \qquad \text{EQ 1}$$

where P is any cluster set of mutually adjacent three cells, and $$\bigcap_{i \in \Omega} E_i = \phi \qquad \text{EQ 2}$$

where $\Phi$ is the null set and where $\Omega$ is a set of macrocells belonging to a universal cluster, the universal cluster being the minimal set of clustered macrocells with no common exclusion channels.

9. The apparatus of claim 8 wherein at least one cell of the underlay system is located solely in one macrocell of the overlay system.

10. The apparatus of claim 8 wherein at least one cell of the underlay system is located so as to overlap into two mutually adjacent macrocells of the overlay system.

11. The apparatus of claim 8 wherein at least one cell of the underlay system is located so as to overlap into three mutually adjacent macrocells of the overlay system, and $|\Omega|$ is greater than 3.

12. The apparatus of claim 8 further comprising the step of
selecting the size of the universal cluster, $\Omega$, to be as small as possible.

13. The apparatus of claim 8 wherein the size of the exclusion set per cell, $|E_i|$, is as small as possible.

14. The apparatus of claim 8 wherein the common exclusion set per cluster C, $$\bigcap_{i \in C} E_i,$$

for all $|C|<|\Omega|$, is as small as possible.

15. At least one centralized access controller apparatus for providing Dynamic Channel Assignment (DCA) for macrocells of at least a part of an overlay system to facilitate the coexistence of at least one autonomous underlay system, the at least one centralized access controller apparatus comprising (A) means for receiving a request for a predetermined number of communication channels needed by an embedded autonomous underlay system having one or more cells of the underlay system which overlap one or more macrocells of the overlay system, (B) means, responsive to the received request, for excluding a predetermined number of channels from use by the one or more macrocells of the overlay system, said excluded channels selected randomly and distributively in each of the one or more macrocells so as to statistically satisfy both $$\left| \bigcap_{i \in P} E_i \right| \geq N_{min} \qquad \text{EQ 1}$$

where $N_{min}$ is the minimum number of channels available for the underlay system and where $E_i$ is the set of channels to be excluded from a macrocell i of the overlay system, and P is the cluster set of cells, and $$\bigcap_{i \in \Omega} E_i = \phi \qquad \text{EQ 2}$$

where $\Phi$ is the null set and where $\Omega$ is a set of cells belonging to a universal cluster, the universal cluster being the minimal set of clustered cells with no common exclusion channels, (C) means for signaling a base station for each of the one or more macrocells of the overlay system, to exclude said predetermined number of channels from use by said each one or more macrocells, and (D) means for sending an assignment signal to the underlay system identifying said predetermined number of channels that are to be used for communications by the underlay system.

16. The apparatus of claim 15 further comprising the step of selecting the size of the universal cluster, $\Omega$, to be as small as possible.

17. The apparatus of claim 15 wherein the size of the exclusion set per cell, $|E_i|$, is as small as possible.

18. The apparatus of claim 15 wherein the common exclusion set per cluster C, $$\bigcap_{i \in C} E_i,$$

for all $|C|<|\Omega|$, is as small as possible.

19. A base station apparatus for providing Dynamic Channel Assignment (DCA) for a macrocell of at least a part of an overlay system to facilitate the coexistence of at least one autonomous underlay system located within the overlay system, comprising (A) means for receiving a request for a predetermined number of communication channels from an autonomous underlay system having one or more cells of the underlay system which overlap one or more macrocells of the overlay system, (B) means, responsive to the received request, for signaling other base stations of the one or more macrocells of the overlay system which overlap cells of the requesting underlay system to exclude a predetermined number of channels from use by those macrocell of the overlay system, (C) means for determining, in conjunction with other base stations of the overlay system, which predetermined number of channels should be excluded from use by the one or more macrocells of the overlay system, said excluded channels being randomly selected and distributed in each of the one or more macrocells so as to statistically satisfy both $$\left| \bigcap_{i \in P} E_i \right| \geq N_{\min} \qquad \text{EQ 1}$$

where $N_{min}$ is the minimum number of channels available for the underlay system and where $E_i$ is the set of channels to be excluded from a macrocell i of the overlay system, and P is the cluster set of mutually adjacent macrocells, and $$\bigcap_{i \in \Omega} E_i = \phi \qquad \text{EQ 2}$$

where $\Phi$ is the null set and where $\Omega$ is a set of macrocells belonging to a universal cluster, the universal cluster being the minimal set of clustered macrocells with no common exclusion channels, and (D) means for sending an assignment signal to the requesting underlay system identifying said excluded channels that are to be used for communications by the requesting underlay system.

20. The apparatus of claim 19 further comprising the step of selecting the size of the universal cluster, $\Omega$, to be as small as possible.

21. The apparatus of claim 19 wherein the size of the exclusion set per cell, $|E_i|$, is as small as possible.

22. The apparatus of claim 19 wherein the common exclusion set per cluster C, $$\bigcap_{i \in C} E_i,$$

for all $|C|<|\Omega|$, is as small as possible.

23. An overlay system having at least a part thereof including a plurality of cells for providing a predefined exclusion of communication channels to facilitate the coexistence of at least one autonomous underlay system, comprising (A) at a base station of one or more macrocells of the overlay system which overlap one or more cells of the underlay system, means for excluding a predetermined number of communication channels for use by the at least one autonomous underlay system, wherein said excluded channels are selected randomly and distributively in each of the one or more macrocells of the overlay system so as to statistically satisfy both $$\left| \bigcap_{i \in P} E_i \right| \geq N_{\min} \qquad \text{EQ 1}$$

where $N_{min}$ is the minimum number of channels available for the underlay system and where $E_i$ is the set of channels to be excluded from macrocell i, and P is the cluster set of cells, and $$\bigcap_{i \in \Omega} E_i = \phi \qquad \text{EQ 2}$$

where $\Phi$ is the null set and where $\Omega$ is a set of macrocells belonging to a universal cluster, the universal cluster being the minimal set of clustered macrocells with no common exclusion channels and (B) at a base station of the underlay system, means for scanning the communication channels to determine the excluded channels to be used by the at least one underlay system.

24. The apparatus of claim 23 further comprising the step of selecting the size of the universal cluster, $\Omega$, to be as small as possible.

25. The apparatus of claim 23 wherein the size of the exclusion set per cell, $|E_i|$, is as small as possible.

26. The apparatus of claim 23 wherein the common exclusion set per cluster C, $$\bigcap_{i \in C} E_i,$$

for all $|C|<|\Omega|$, is as small as possible.

27. A plurality of distributed access controllers for providing Dynamic Channel Assignment (DCA) for macrocells of at least a part of an overlay system to facilitate the coexistence of at least one autonomous underlay system, at least one distributed access controller comprising (A) means for receiving a request for a predetermined number of communication channels needed by an embedded autonomous underlay system having one or more cells of the at least one underlay system which overlap one or more macrocells of the overlay system, (B) means, responsive to the received request, for excluding a predetermined number of channels from use by the one or more macrocells of the overlay system, said excluded channels selected randomly and distributively in each of the one or more macrocells so as to statistically satisfy both $$\left| \bigcap_{i \in P} E_i \right| \geq N_{min} \qquad \text{EQ 1}$$

where $N_{min}$ is the minimum number of channels available for the underlay system and where $E_i$ is the set of channels to be excluded from a macrocell i of the overlay system, and P is the cluster set of cells, and $$\bigcap_{i \in \Omega} E_i = \phi \qquad \text{EQ 2}$$

where $\Phi$ is the null set and where $\Omega$ is a set of cells belonging to a universal cluster, the universal cluster being the minimal set of clustered cells with no common exclusion channels, (C) means for signaling a base station for each of the one or more macrocells of the overlay system, to exclude said predetermined number of channels from use by said each macrocell, and (D) means for sending an assignment signal to the underlay system identifying said predetermined number of channels that are to be used for communications by the at least one underlay system.

* * * * *